(12) United States Patent
Lee et al.

(10) Patent No.: US 8,902,509 B2
(45) Date of Patent: Dec. 2, 2014

(54) VARIFOCAL LENS STRUCTURE, METHOD OF MANUFACTURING THE VARIFOCAL LENS STRUCTURE, OPTICAL LENS MODULE INCLUDING THE VARIFOCAL LENS STRUCTURE, AND METHOD OF MANUFACTURING THE OPTICAL LENS MODULE

(75) Inventors: Jeong-yub Lee, Seoul (KR); Seung-tae Choi, Hwaseong-si (KR); Seung-wan Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 638 days.

(21) Appl. No.: 13/155,438

(22) Filed: Jun. 8, 2011

(65) Prior Publication Data

US 2012/0147478 A1    Jun. 14, 2012

(30) Foreign Application Priority Data

Dec. 14, 2010  (KR) .................. 10-2010-0127870

(51) Int. Cl.
*G02B 1/06*  (2006.01)
*G02B 3/14*  (2006.01)

(52) U.S. Cl.
CPC .................................... *G02B 3/14* (2013.01)
USPC ........................................................ 359/666

(58) Field of Classification Search
USPC ................................................. 359/665, 666
See application file for complete search history.

(56) References Cited

U.S. PATENT DOCUMENTS

| 6,995,916 B2 | 2/2006 | Yamanaka et al. |
| 7,580,195 B2 * | 8/2009 | Choi et al. ..................... 359/665 |
| 2007/0263293 A1 | 11/2007 | Batchko et al. |

FOREIGN PATENT DOCUMENTS

| KR | 10-2006-0101120 A | 9/2006 |
| KR | 10-2008-0043106 A | 5/2008 |
| KR | 10-2009-0014584 A | 2/2009 |
| KR | 10-2009-0059419 A | 6/2009 |
| KR | 10-2009-0077576 A | 7/2009 |
| KR | 10-2009-0127296 A | 12/2009 |
| KR | 10-2010-0078705 A | 7/2010 |

* cited by examiner

Primary Examiner — Joseph P Martinez
(74) Attorney, Agent, or Firm — Sughrue Mion, PLLC

(57) ABSTRACT

A varifocal lens structure, a method of manufacturing the varifocal lens structure, an optical lens module, and a method of manufacturing the optical lens module. The varifocal lens structure includes a liquid lens unit including a silicone membrane that includes a first silicone elastomer, a polymer actuator disposed on an upper surface of the silicone membrane, and an adhesive silicone layer that is disposed between the silicone membrane and the polymer actuator and includes a second silicone elastomer.

39 Claims, 10 Drawing Sheets

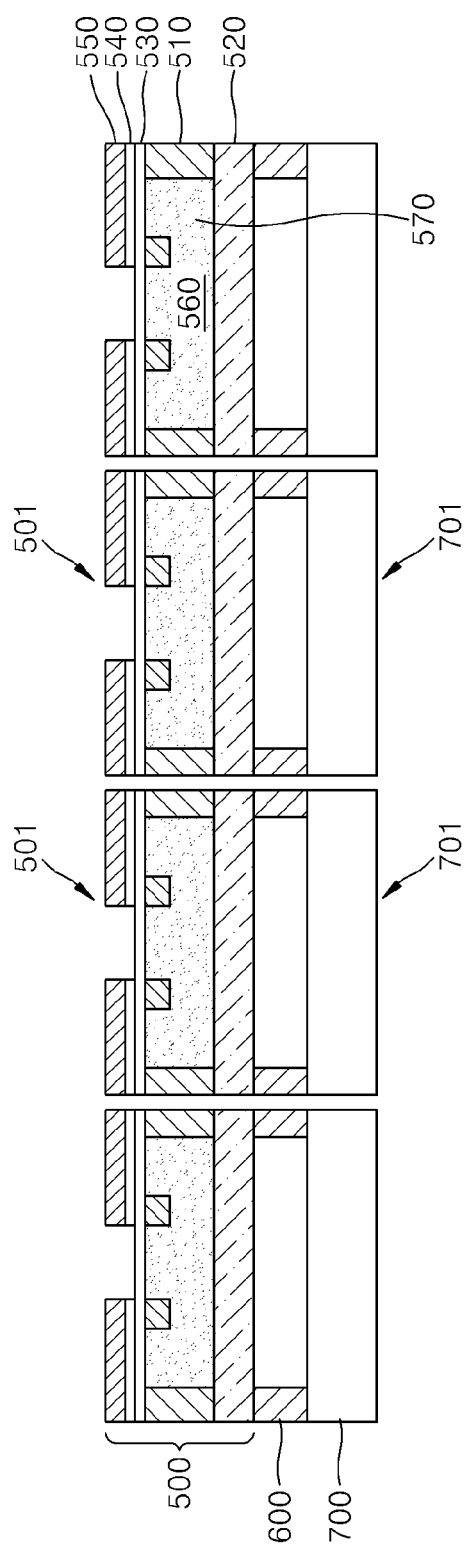

VARIFOCAL LENS STRUCTURE, METHOD OF MANUFACTURING THE VARIFOCAL LENS STRUCTURE, OPTICAL LENS MODULE INCLUDING THE VARIFOCAL LENS STRUCTURE, AND METHOD OF MANUFACTURING THE OPTICAL LENS MODULE

CROSS-REFERENCE TO RELATED APPLICATIONS

This application claims the priority from Korean Patent Application No. 10-2010-0127870, filed on Dec. 14, 2010, in the Korean Intellectual Property Office, the disclosure of which is incorporated herein by reference.

BACKGROUND

1. Field

Apparatus and methods consistent with the exemplary embodiments relate to varifocal lens structures, methods of manufacturing the varifocal lens structures, optical lens modules including the varifocal lens structures, and methods of manufacturing the optical lens modules.

2. Description of the Related Art

Related art portable communication devices are evolving into multi-purpose electronic devices having various functions including, in addition to a calling function and a message delivery function, a camera function, a game function, a music reproduction function, and an Internet function. Also, there are efforts to integrate more functions in a small space in portable communication devices. Among various modules integrated in portable communication devices, reducing the size of a camera module requires miniaturization of an image forming optical system in the camera module. Meanwhile, an automatic focusing function, a shake correction function, and a zooming function are needed for image quality. However, in view of the adding of the functions to a camera module, the camera module is to be limited in size. An automatic focusing function may be embodied in a camera module by using, for example, a step motor, a voice coil motor (VCM), or a liquid lens. However, methods using step motors and voice coils are not appropriate for use in portable communication devices since the portable communication devices are to be limited in size. In addition, there are manufacturing costs associated with forming step motors and voice coils in batch processes.

Very small related art varifocal lens structures that have small thicknesses, that control focal distances, and that are manufactured at a wafer level are being developed. In the varifocal lens structure, a fluid chamber filled with an optical fluid is sealed with a transparent elastic membrane, and a polymer actuator is disposed on the elastic membrane. In this structure, if the polymer actuator is driven, a pressure applied to the optical fluid is changed, and due to the pressure change, the elastic membrane is deformed, thereby changing a focal distance of a lens. Varifocal lens structures may be disposed, for example, in front of a camera module and used when an automatically focusing function is carried out.

In the varifocal lens structure, an elastic membrane may be formed of, in general, a hydrophobic material. Accordingly, when an acryl-based or epoxy-based adhesive agent is used to bond the elastic membrane to a polymer actuator, an adhesive force between the adhesive agent and the elastic membrane may be decreased.

SUMMARY

Aspects of the exemplary embodiments relate to varifocal lens structures, methods of manufacturing the varifocal lens structures, optical lens modules including the varifocal lens structures, and methods of manufacturing the optical lens modules.

According to an exemplary embodiment, a varifocal lens structure includes a liquid lens unit including a silicone membrane that includes a first silicone elastomer, a polymer actuator disposed on an upper surface of the silicone membrane, and an adhesive silicone layer disposed between the silicone membrane and the polymer actuator, and includes a second silicone elastomer.

The first and second silicone elastomers may be the same or different materials. Each of the first and second silicone elastomers includes polydimethylsiloxane (PDMS), polymethylphenylsiloxane (PMPS), or polyvinylsiloxane (PVS).

The liquid lens unit may include a frame having a fluid chamber filled with an optical fluid, the silicone membrane disposed on an upper surface of the frame, covering the fluid chamber, and a transparent substrate disposed on a lower surface of the frame to form a bottom of the fluid chamber. The silicone membrane may include a driving portion on which the polymer actuator is disposed, and a variable lens portion that is surrounded by the driving portion and changes a focal distance.

Each of the polymer actuator and the adhesive silicone layer has a through-hole corresponding to the variable lens portion.

According to another exemplary embodiment, a method of manufacturing a varifocal lens structure includes preparing a liquid lens unit including a silicone membrane that includes a first silicone elastomer, forming an adhesive silicone layer that includes a second silicone elastomer on a surface of a polymer actuator, and bonding the silicone membrane to the adhesive silicone layer.

The method may further include, before the bonding of the silicone membrane to the adhesive silicone layer, treating surfaces of the silicone membrane and the adhesive silicone layer that are to be bonded with oxygen plasma.

The silicone membrane is bonded to the adhesive silicone layer under pressure in a vacuum condition.

The forming of the adhesive silicone layer may include applying the second silicone elastomer in a liquid form on a polymer actuator material layer, curing the liquid second silicone elastomer to form an adhesive silicone material layer, and forming a through-hole corresponding to the variable lens portion in each of the polymer actuator material layer and the adhesive silicone material layer, thereby forming the polymer actuator and the adhesive silicone layer.

The method may further include, before the liquid second silicone elastomer is applied, treating a surface of the polymer actuator material layer with oxygen plasma.

According to another exemplary embodiment, an optical lens module includes a varifocal lens structure for changing a focal distance by using an optical fluid; an optical device spaced apart from the varifocal lens structure, and a silicone spacer disposed between the varifocal lens structure and the optical device and includes a silicone elastomer.

Each of a surface of the varifocal lens structure bonded to the silicone spacer and a surface of the optical device that is bonded to the silicone spacer includes silicon or silicon oxide.

The silicone spacer is disposed at edges of the varifocal lens structure and the optical device. The silicone spacer includes at least one air vent.

The silicone spacer is attached to the transparent substrate and the transparent substrate includes glass. The elastic membrane may include a silicone elastomer, and an adhesive silicone layer that includes a silicone elastomer is disposed between the elastic membrane and the actuator. The optical device may include a fixed focal lens structure.

According to another exemplary embodiment, a method of manufacturing an optical lens module includes preparing an optical device wafer including a varifocal lens wafer including a plurality of integrated varifocal lens structures and an optical device wafer including a plurality of integrated optical devices, attaching a surface of a silicone spacer that includes a silicone elastomer to one selected from the group consisting of varifocal lens wafer and the optical device wafer, attaching the unselected one to another surface of the silicone spacer, and dicing the varifocal lens wafer and the optical device wafer.

The silicone spacer may include at least one air vent.

Each of a surface of the varifocal lens structure that is bonded to the silicone spacer and a surface of the optical device that is bonded to the silicone spacer includes silicon or silicon oxide.

The surface of the varifocal lens wafer and the surface of the optical device wafer are treated with oxygen plasma before the silicone spacer is attached.

BRIEF DESCRIPTION OF THE DRAWINGS

These and/or other aspects will become apparent from the following description of the exemplary embodiments, taken in conjunction with the accompanying drawings of which:

FIGS. 12 through 15 are cross-sectional views for explaining a method of manufacturing an optical lens module, according to an exemplary embodiment.

DETAILED DESCRIPTION OF THE EXEMPLARY EMBODIMENTS

Figure 1:
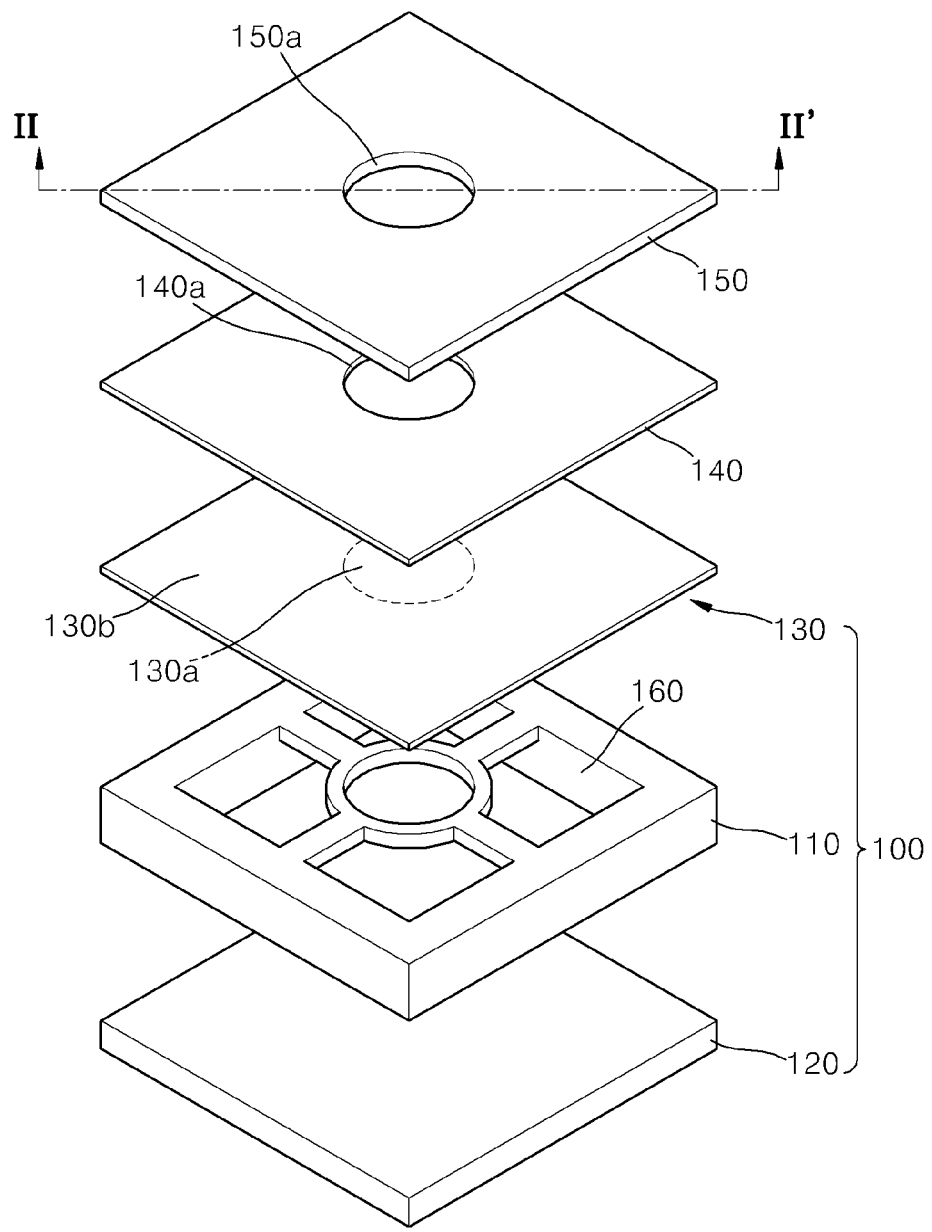
FIG. 1 is an exploded perspective view of a varifocal lens structure according to an exemplary embodiment.

Reference will now be made in detail to embodiments, examples of which are illustrated in the accompanying drawings, wherein like reference numerals refer to like elements throughout and sizes or thicknesses of illustrated elements are exaggerated for clarity. In this regard, the exemplary embodiments may have different forms and should not be construed as being limited to the descriptions set forth herein. Accordingly, the exemplary embodiments are described below, by referring to the figures, to explain aspects thereof.

Figure 2:
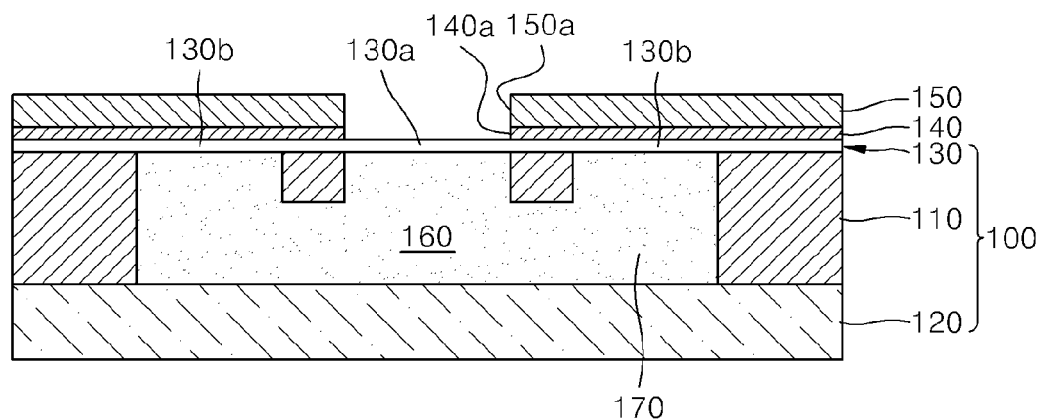
FIG. 2 is a cross-sectional view taken along a line II-II' of FIG. 1 according to an exemplary embodiment.

FIG. 1 is an exploded perspective view of a varifocal lens structure according to an exemplary embodiment, and FIG. 2 is a cross-sectional view taken along a line II-II' of FIG. 1.

Referring to FIGS. 1 and 2, the varifocal lens structure according to the exemplary embodiment includes a liquid lens unit 100, a polymer actuator 150 disposed on the liquid lens unit 100, and an adhesive silicone layer 140 interposed between the liquid lens unit 100 and the polymer actuator 150. The liquid lens unit 100 may include a frame 110 having a fluid chamber 160, a silicone membrane 130 disposed on an upper surface of the frame 110, and a transparent substrate 120 disposed on a lower surface of the frame 110. The fluid chamber 160 of the frame 110 is filled with an optical fluid 170, which functions as a lens. The optical fluid 170 may be oil (e.g., transparent) or alternatively, may be selected from various other liquid materials that may be substituted for oil as would be understood by one skilled in the art. The frame 110 may include, for example, silicon (Si), and various other materials may also be used to form the frame 110. The shape of the frame 110 illustrated in FIGS. 1 and 2 is exemplary and is not limited thereto.

The transparent substrate 120 is disposed on the lower surface of the frame 110. The transparent substrate 120 forms a bottom of the fluid chamber 160, and may be formed of, for example, glass. However, the material for forming the transparent substrate 120 is not limited thereto, and another substrate material may be substituted therefor as would be understood by those skilled in the art.

The silicone membrane 130 is disposed on the upper surface of the frame 110. The silicone membrane 130 may cover the fluid chamber 160. The silicone membrane 130 may be formed of a first silicone elastomer. The first silicone elastomer may include, for example, polydimethylsiloxane (PDMS), polymethylphenylsiloxane (PMPS) or polyvinylsiloxane (PVS), but are not limited thereto, and other materials may be substituted therefore as would be understood by those skilled in the art. The first silicone elastomer may also include other materials. The silicone membrane 130 may be formed by attaching a sheet formed of the first silicone elastomer to the upper surface of the frame 110. If the sheet is attached after the upper surface of the frame 110 is treated with oxygen plasma, the silicone membrane 130 may be attached (e.g., strongly) to the upper surface of the frame 110.

The silicone membrane 130 may include a driving portion 130b on which the polymer actuator 150 is disposed and a variable lens portion 130a surrounded by the driving portion 130b. The variable lens portion 130a may be circular, and disposed in a central region of the silicone membrane 130, and is deformed when a pressure is applied to the optical fluid 170 through the driving portion 130b, thereby changing a focal distance.

The polymer actuator 150 is disposed on the silicone membrane 130. For example, the polymer actuator 150 is disposed on the driving portion 130b of the silicone membrane 130. Accordingly, a central portion of the polymer actuator 150 has a through-hole 150a having a shape substantially corresponding to the variable lens portion 130a. When the polymer actuator 150 drives, a pressure is applied to the optical fluid 170 through the driving portion 130b of the silicone membrane 130. Due to the applied pressure, the variable lens portion 130a of the silicone membrane 130 is deformed and thus a focal distance of the optical fluid acting as a lens is changed. The polymer actuator 150 may be formed of, for example, an electro active polymer (EAP) that is formed as a thin film and has low power consumption. However, the material for forming the polymer actuator 150 is not limited thereto, and other materials may be substituted therefore as would be understood by one skilled in the art. The polymer actuator 150 may also be formed of other polymers.

The adhesive silicone layer 140 is formed between the polymer actuator 150 and the silicone membrane 130. The adhesive silicone layer 140 may allow the polymer actuator 150 and the silicone membrane 130 to be bonded to each other. To do this, the adhesive silicone layer 140 may include a second silicone elastomer. Like the first silicone elastomer, the second silicone elastomer may include, for example, polydimethylsiloxane (PDMS), polymethylphenylsiloxane (PMPS), or polyvinylsiloxane (PVS), but is not limited thereto. The second silicone elastomer and the first silicone elastomer may be formed of different materials. For example, the first silicone elastomer may be formed of PDMS and the second silicone elastomer may be formed of PMPS. However, the first and second silicone elastomers are not limited thereto and the first and second silicone elastomers may each be formed of any various other materials.

If the silicone membrane 130 is bonded to the adhesive silicone layer 140 after the silicone membrane 130 and the adhesive silicone layer 140 are surface-treated with oxygen plasma, a permanent bond having an adhesive force (e.g., very strong) may be present therebetween. For example, if a hydrophobic surface of a silicone elastomer is treated with oxygen plasma, a hydroxyl group (—OH) is formed at the surface of the silicone elastomer, and thus the hydrophobic surface is changed into a hydrophilic surface, and chains of some of hydroxyl groups may be disconnected, thereby changing (e.g., increasing) a surface energy. Accordingly, if a silicone elastomer that is surface-treated with oxygen plasma is subjected to bonding within a time period (e.g., predetermined), for example, about 30 minutes, a permanent bond having an adhesive force (e.g., very strong) may be obtained.

Also, if a surface of the polymer actuator 150 is treated with oxygen plasma before the adhesive silicone layer 140 is attached to the polymer actuator 150, the adhesive silicone layer 140 may be strongly attached to the treated surface of the polymer actuator 150. Meanwhile, the first and second silicone elastomers respectively forming the silicone membrane 130 and the adhesive silicone layer 140 are soft materials each having a Young's modulus of about 1.5 Mpa or lower. Thus, a driving force of the polymer actuator 150 may be delivered to the optical fluid 170 without substantial loss.

As described above, in the exemplary embodiment, the liquid lens unit 100 includes the silicone membrane 130 formed of the first elastomer, and the adhesive silicone layer 140 formed of the second silicone elastomer is formed between the silicone membrane 130 and the polymer actuator 150 so as to attach (e.g., strongly) the silicone membrane 130 to the polymer actuator 150. Also, since the first and second silicone elastomers respectively forming the silicone membrane 130 and the adhesive silicone layer 140 have waterproof characteristics and chemical-resistant characteristics, permeation of water molecules and harmful chemical materials may be substantially prevented. Also, since the first and second silicone elastomers have high-temperature reliability, the first and second silicone elastomers may be used in a high-temperature process.

Figure 3:
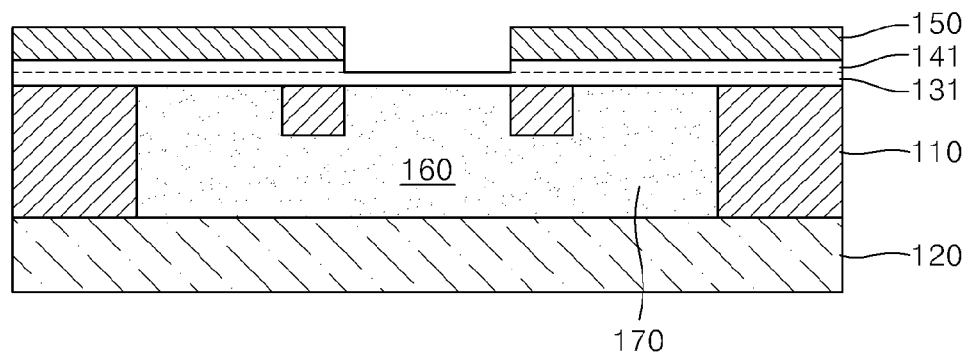
FIG. 3 is a cross-sectional view of a varifocal lens structure according to another exemplary embodiment.

As described above with respect to the exemplary embodiment, the first silicone elastomer used to form the silicone membrane 130 is different from the second silicone elastomer used to form the adhesive silicone layer 140. However, as illustrated in FIG. 3, the first silicone elastomer used to form the silicone membrane 131 may be substantially the same as the second silicone elastomer used to form an adhesive silicone layer 141. In this case, the first and second silicone elastomers may each be formed of, for example, PDMS. Alternatively, the first and second silicone elastomers may each be formed of PMPS. When the first and second silicone elastomers are the same, the silicone membrane 131 and the adhesive silicone layer 141 may be integrally formed of the same material as one body by permanent bonding.

FIGS. 4 through 8 are cross-sectional views for explaining a method of manufacturing a varifocal lens structure, according to an exemplary embodiment.

Figure 4:
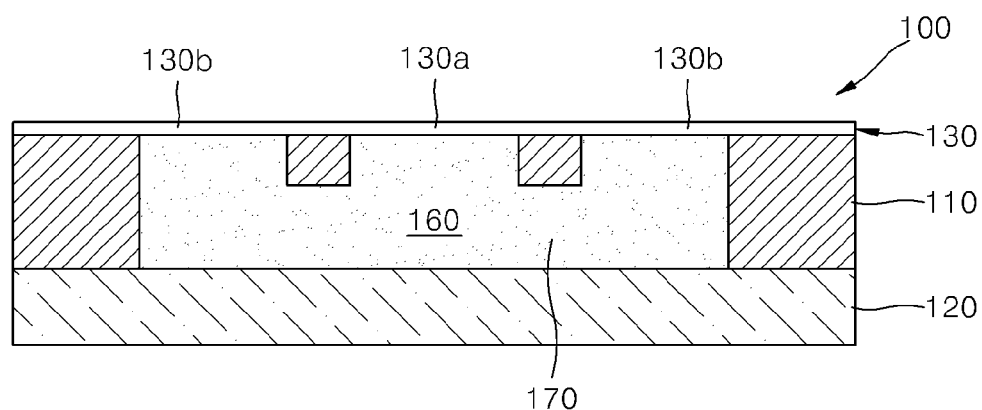
FIGS. 4 through 8 are cross-sectional views for explaining a method of manufacturing a varifocal lens structure, according to an exemplary embodiment.

Referring to FIG. 4, a liquid lens unit 100 is prepared. As explained above with respect to the exemplary embodiment, the liquid lens unit 100 may include a frame 110 having a fluid chamber 160, a silicone membrane 130 formed on an upper surface of the frame 110, and a transparent substrate 120 formed on a lower surface of the frame 110. The fluid chamber 160 of the frame 110 is filled with an optical fluid 170 that functions as a lens. The optical fluid 170 may be oil (e.g., transparent) or any of various other liquid materials. The frame 110 may include, for example, silicon (Si) or any of various other materials. The transparent substrate 120 may be, for example, a glass substrate, but is not limited thereto.

To manufacture the liquid lens unit 100, the transparent substrate 120 is attached to the lower surface of the frame 110, the fluid chamber 160 is filled with the optical fluid 170, and then the silicone membrane 130 is formed on the upper surface of the frame 110, covering the fluid chamber 160.

As explained above, the silicone membrane 130 may include a first silicone elastomer. The first silicone elastomer may include, for example, PDMS, PMPS, or PVS, but is not limited thereto. The silicone membrane 130 may be formed by attaching a sheet formed of the first silicone elastomer to the upper surface of the frame 110. If the sheet is attached after the upper surface of the frame 110 is treated with oxygen plasma, the silicone membrane 130 may be attached (e.g., strongly) to the upper surface of the frame 110. In this case, the silicone membrane 130 may include a driving portion 130b on which a polymer actuator 150 is disposed and a variable lens portion 130a that is surrounded by the driving portion 130b and that changes a focal distance.

Figure 5:
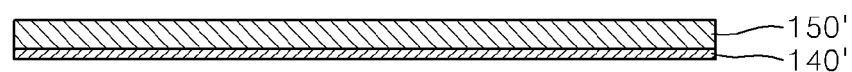

Referring to FIG. 5, a polymer actuator material layer 150' for forming the polymer actuator 150 (see FIG. 6) is formed. In this regard, the polymer actuator material layer 150' may be formed of, for example, EAP or other polymers. Subsequently, a lower surface of the polymer actuator material layer 150' may be treated with oxygen plasma so as to allow a second silicone elastomer in a liquid form to be well attached thereto. However, instead of the oxygen plasma treatment, an adhesion promoter may be formed on the lower surface of the polymer actuator material layer 150'. Next, an adhesive silicone material layer 140' formed of the second silicone elastomer may be formed on the lower surface of the polymer actuator material layer 150'. Like the first silicone elastomer, the second silicone elastomer may include, for example, PDMS, PMPS, or PVS, but are not limited thereto. The second silicone elastomer and the first silicone elastomer may be formed of the same or different materials.

To form the adhesive silicone material layer 140', the liquid second silicone elastomer is applied to the lower surface of the polymer actuator material layer 150' treated with oxygen plasma, and then cured. Accordingly, the adhesive silicone material layer 140' may be attached (e.g., strongly) to the lower surface of the polymer actuator material layer 150'.

Figure 6:
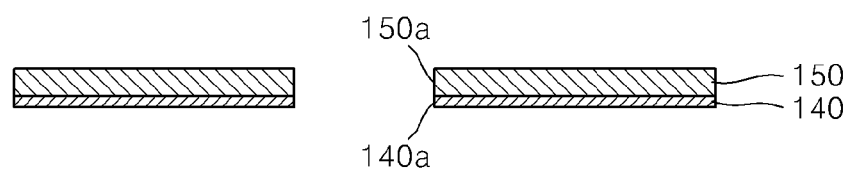

Referring to FIG. 6, a through-hole 150a substantially corresponding to the variable lens portion 130a is formed in the polymer actuator material layer 150', thereby forming the polymer actuator 150. Further, a through-hole 140a corresponding to the variable lens portion 130a is formed in the adhesive silicone material layer 140' by, for example, a laser process, thereby forming the adhesive silicone layer 140.

Figure 7:
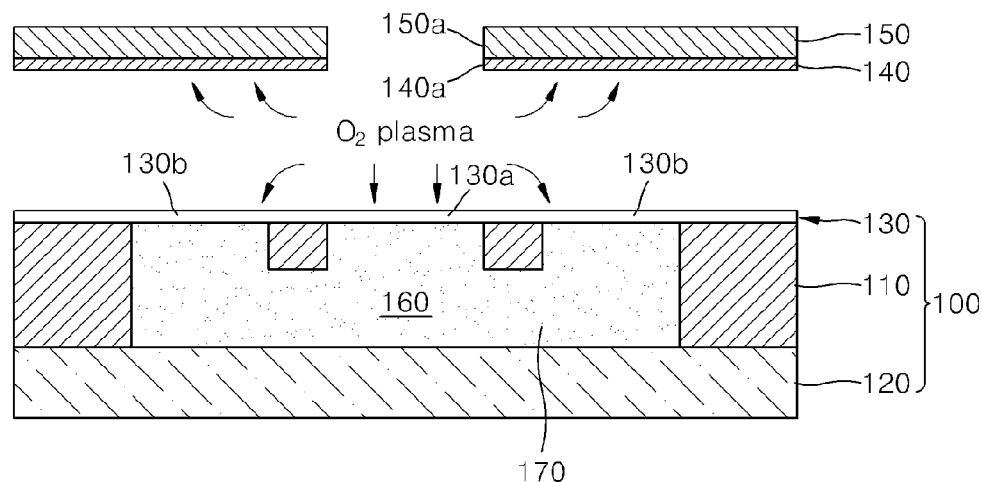

Referring to FIG. 7, an upper surface of the silicone membrane 130 and a lower surface of the adhesive silicone layer 140 are treated with oxygen plasma, and then the silicone membrane 130 and the adhesive silicone layer 140 are attached to each other under pressure in a vacuum condition. As described above, if the silicone membrane 130 and the adhesive silicone layer 140 are attached to each other after the oxygen plasma surface treatment, a permanent bond having an adhesive force (e.g., very strong) may be obtained. That is, if a hydrophobic surface of a silicone elastomer is treated with oxygen plasma, a hydroxyl group (—OH) is formed on the hydrophobic surface and thus the hydrophilic surface is changed into a hydrophilic surface, and chains of some of hydroxyl groups are disconnected, thereby increasing a surface energy. Accordingly, if a silicone elastomer that is surface-treated with oxygen plasma is subjected to bonding within a time period (e.g., predetermined), for example, about 30 minutes, a permanent bond having an adhesive force (e.g., very strong) may be obtained.

Figure 8:
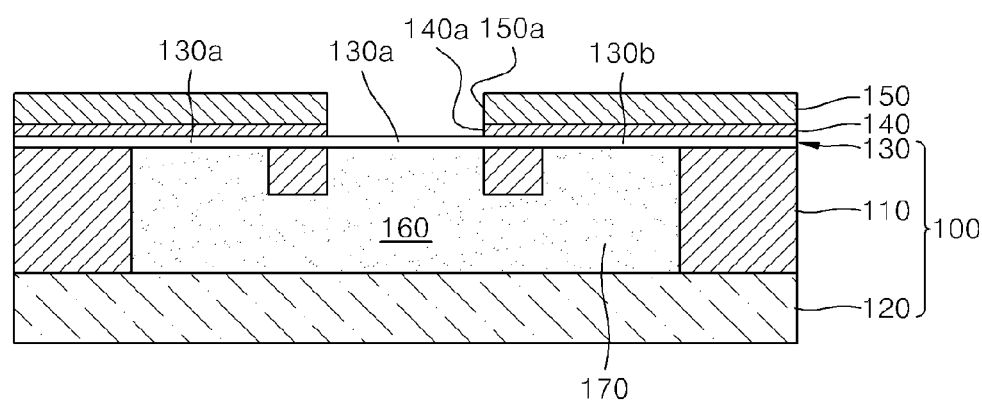

Thus, as illustrated in FIG. 8, manufacturing of a variable lens structure in which the silicone membrane 130 and the adhesive silicone layer 140 are attached (e.g., strongly) to each other is completed. Also, since the silicone membrane 130 and the adhesive silicone layer 140 are attached to each other under pressure in a vacuum condition, contact surfaces of the silicone membrane 130 and the adhesive silicone layer 140 are attached (e.g., strongly) to each other without forming voids even when the contact surfaces have warpage or defects.

Figure 9:
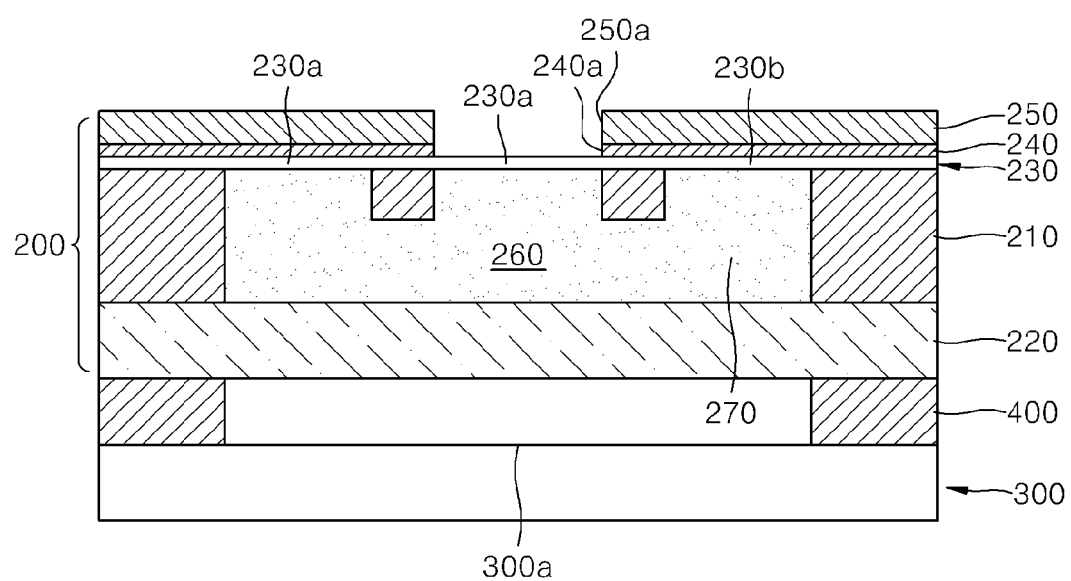
FIG. 9 is a cross-sectional view of an optical lens module according to an exemplary embodiment.

FIG. 9 is a cross-sectional view of an optical lens module according to an exemplary embodiment. The optical lens module according to the exemplary embodiment includes a varifocal lens structure 200 that changes a focal distance by using an optical fluid 270, an optical device 300 that is separable from the varifocal lens structure 200, and a silicone spacer 400 disposed between the variable lens structure 200 and the optical device 300 and may be formed of a silicone elastomer.

The varifocal lens structure 200 may include a frame 210 having a fluid chamber 260 filled with the optical fluid 270, a transparent substrate 220 disposed on a lower surface of the frame 210, an elastic membrane 230 disposed on an upper surface of the frame 210, and an actuator 250 disposed on the elastic membrane 230.

An adhesive layer 240 may be further formed between the elastic membrane 230 and the actuator 250. The frame 210 may include, for example but not by way of limitation, silicon (Si), but is not limited thereto. The optical fluid 270 may be, for example but not by way of limitation, oil (e.g., transparent). A lower surface of the transparent substrate 220 may include silicon or silicon oxide so that the transparent substrate 220 is attached (e.g., strongly) to the silicone spacer 400. For example but not by way of limitation, the transparent substrate 220 may be a glass substrate.

The elastic membrane 230 may include a driving portion 230b on which the actuator 250 is disposed, and a variable lens portion 230a that is surrounded by the driving portion 230b and changes a focal distance. The elastic membrane 230 may include a silicone elastomer, as described above. The silicone elastomer may include, for example, PDMS, PMPS, or PVS. In the exemplary embodiment, the elastic membrane 230 is not limited to a silicone elastomer, and the elastic membrane 230 may be formed of other materials. The actuator 250 is disposed on the driving portion 230b of the elastic membrane 230. In general, the actuator 250 may be a polymer actuator. However, other types of actuator may be used as the actuator 250. Meanwhile, the actuator 250 may have a through-hole 250a substantially corresponding to the variable lens portion 230a in its central region.

The adhesive layer 240 may be disposed between the elastic membrane 230 and the actuator 250. The adhesive layer 240 may include a silicone elastomer, as described above. In this case, the silicone elastomer used to form the adhesive layer 240 and the silicone elastomer used to form the elastic membrane 230 may include the same or different materials. Accordingly, the elastic membrane 230 and the adhesive layer 240 may be attached (e.g., strongly) to each other. The silicone elastomers used to form the adhesive layer 240 and the elastic membrane 230 have been described above, and thus, will not be described further. In the exemplary embodiment, the adhesive layer 240 may include materials other than a silicone elastomer. Also, the adhesive layer 240 has a through-hole 240a corresponding to the variable lens portion 230a.

The optical device 300 may be spaced apart from and under the varifocal lens structure 200. The optical device 300 may be, for example, a fixed focal lens structure, but is not limited thereto. A surface of the optical device 300 to which the silicone spacer 400 is attached, that is, an upper surface 300a of the optical device 300, may include silicon or silicon oxide so that the optical device 300 is attached (e.g., strongly) to the silicone spacer 400. Also, if the upper surface 300a of the optical device 300 to which the silicone spacer 400 is attached does not include silicon or silicon oxide, a thin silicone elastomer layer may be disposed on the upper surface 300a of the optical device 300.

The silicone spacer 400 is disposed between the varifocal lens structure 200 and the optical device 300. The silicone spacer 400 may include a silicone elastomer. The silicone elastomer may include, for example, PDMS, PMPS or PVS, but is not limited thereto.

Figure 10:
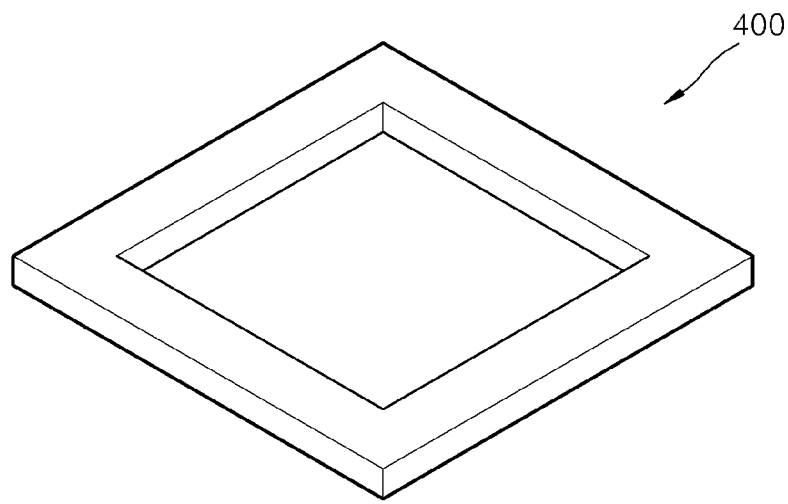
FIG. 10 is a perspective view of a silicone spacer illustrated in FIG. 9 according to an exemplary embodiment.

FIG. 10 is a perspective view of the silicone spacer 400 according to the exemplary embodiment. The silicone spacer 400 may be formed at edges of the varifocal lens structure 200 and the optical device 300. In the exemplary embodiment, the silicone elastomer used to form the silicone spacer 400 may be an elastic material having an elongation of about 80% to 100%. Thus, if the silicone spacer 400 formed of the silicone elastomer is disposed between the varifocal lens structure 200 and the optical device 300, a distance between the varifocal lens structure 200 and the optical device 300 may be maintained substantially constant.

The silicone spacer 400 may be attached with an adhesive force (e.g., strong) to the varifocal lens structure 200 and the optical device 300. More specifically, if a contact surface of the varifocal lens structure 200, that is, the lower surface of the transparent substrate 220, and a contact surface of the silicone spacer 400, that is, an upper surface of the silicone spacer 400 are treated with oxygen plasma, and then the varifocal lens structure 200 and the silicone spacer 400 are bonded to each other under pressure in a vacuum condition, the upper surface of the silicone spacer 400 may be attached with an adhesive force (e.g., strong) to the lower surface of the transparent substrate 220.

Further, if a contact surface of the optical device 300, that is, the upper surface 300a of the optical device 300 and a contact surface of the silicone spacer 400, that is, a lower surface of the silicone spacer 400 are treated with oxygen plasma, and then the optical device 300 and the silicone spacer 400 are bonded to each other under pressure in a vacuum condition, the lower surface of the silicone spacer 400 may be attached with an adhesive force (e.g., strong) to the upper surface 300a of the optical device 300.

Figure 11:
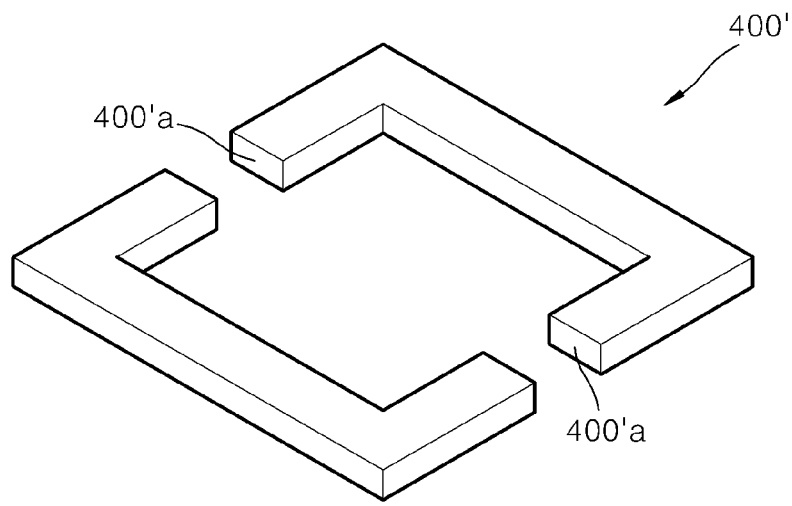
FIG. 11 is a perspective view of a modified example of a silicone spacer illustrated in FIG. 9 according to an exemplary embodiment.

FIG. 11 is a perspective view of a modified exemplary embodiment of the silicone spacer 400 of FIG. 10. A silicone spacer 400' includes at least one air vent 400'a. The air vent 400'a may allow a space surrounded by the silicone spacer 400' to have the substantially same atmospheric condition as the outside in a process of manufacturing an optical lens module, which will be described below.

FIGS. 12 through 15 are cross-sectional views for explaining a method of manufacturing an optical lens module at a wafer-level, according to an exemplary embodiment.

Figure 12:
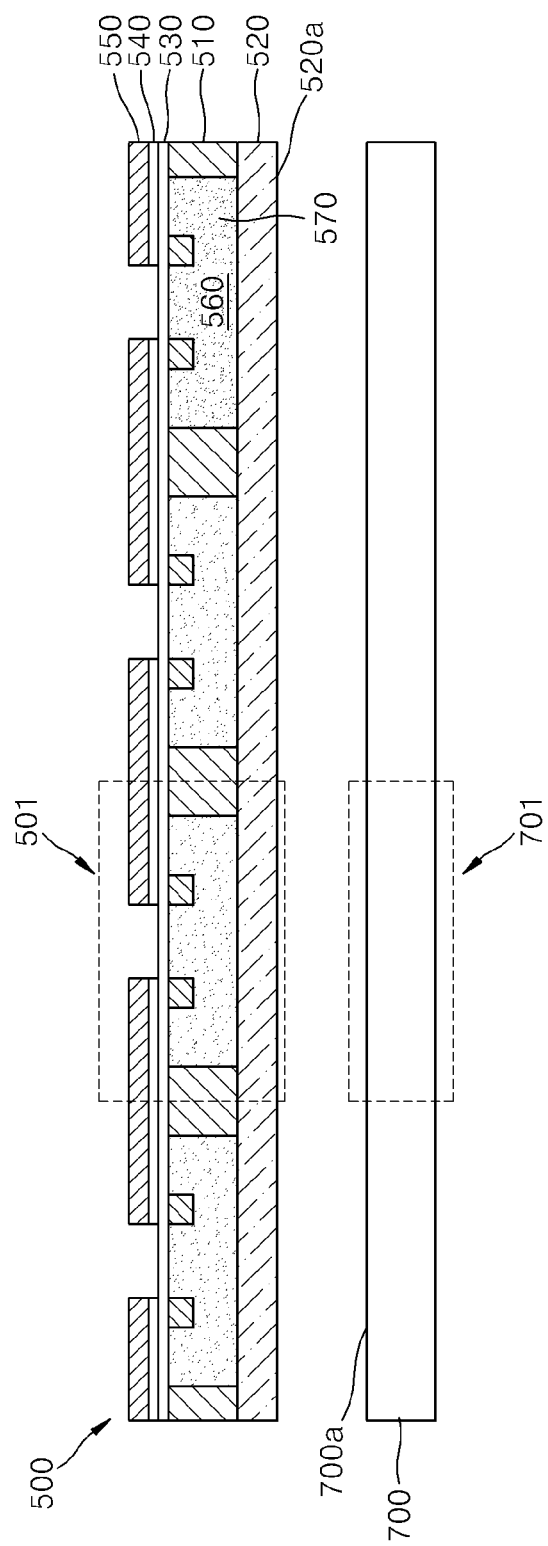

Referring to FIG. 12, a varifocal lens wafer 500 including a plurality of integrated varifocal lens structures 501 and an optical device wafer 700 including a plurality of integrated optical devices 701 are prepared. The varifocal lens wafer 500 may include a frame 510 having a plurality of fluid chambers 560 filled with an optical fluid 570, a transparent substrate 520 disposed on a lower surface of the frame 510, an elastic membrane 530 disposed on an upper surface of the frame 510, and a plurality of actuators 550 disposed on the elastic membrane 530. An adhesive layer 540 may be formed between the elastic membrane 530 and the actuators 550. A contact surface of the transparent substrate 520 to which silicone spacers 600 are to be attached in the subsequent process, that is, a lower surface 520a of the transparent substrate 520, may include silicon or silicon oxide. The transparent substrate 520 may be, for example, a glass substrate.

In the optical device wafer 700, for example, a plurality of fixed focal lens structures may be integrally formed. In this case, a contact surface of the optical device wafer 700 to which the silicone spacers 600 are to be attached in the subsequent process, that is, an upper surface 700a of the optical device wafer 700 may include silicon or silicon oxide. If the upper surface 700a of the optical device wafer 700 does not include silicon or silicon oxide, a silicone elastomer layer (not shown) may be further formed on the upper surface 700a of the optical device wafer 700. To form the silicone elastomer layer, the upper surface 700a of the optical device wafer 700 is treated with oxygen plasma and then a liquid silicone elastomer is applied to the upper surface 700a of the optical device wafer 700 and cured.

Figure 13:
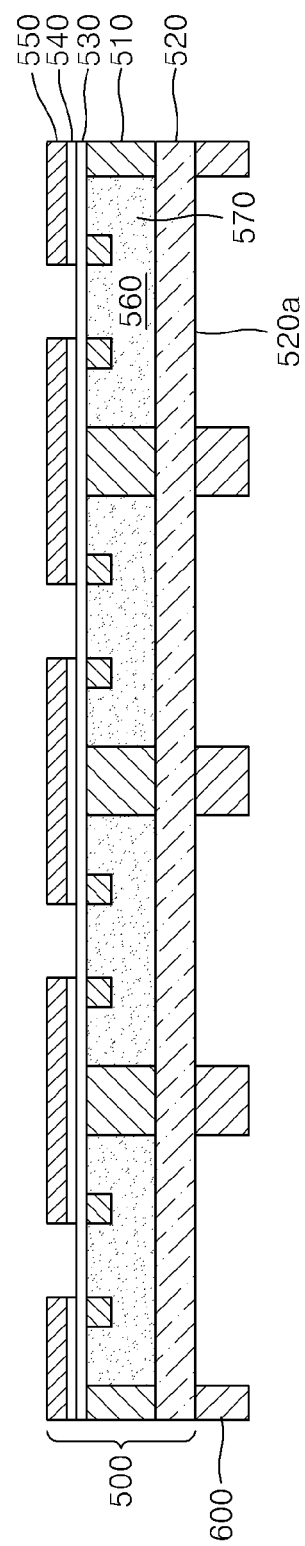

Referring to FIG. 13, the silicone spacers 600 formed of a silicone elastomer are prepared, and upper surfaces of the silicone spacers 600 are attached to the lower surface 520a of the transparent substrate 520. More specifically, if the lower surface 520a of the transparent substrate 520 and the upper surfaces of the silicone spacers 600 are treated with oxygen plasma, and then the transparent substrate 520 and the silicone spacers 600 are bonded to each other under pressure in a vacuum condition, the upper surfaces of the silicone spacers 600 may be attached with an adhesive force (e.g., strong) to the lower surface 520a of the transparent substrate 520.

Figure 14:
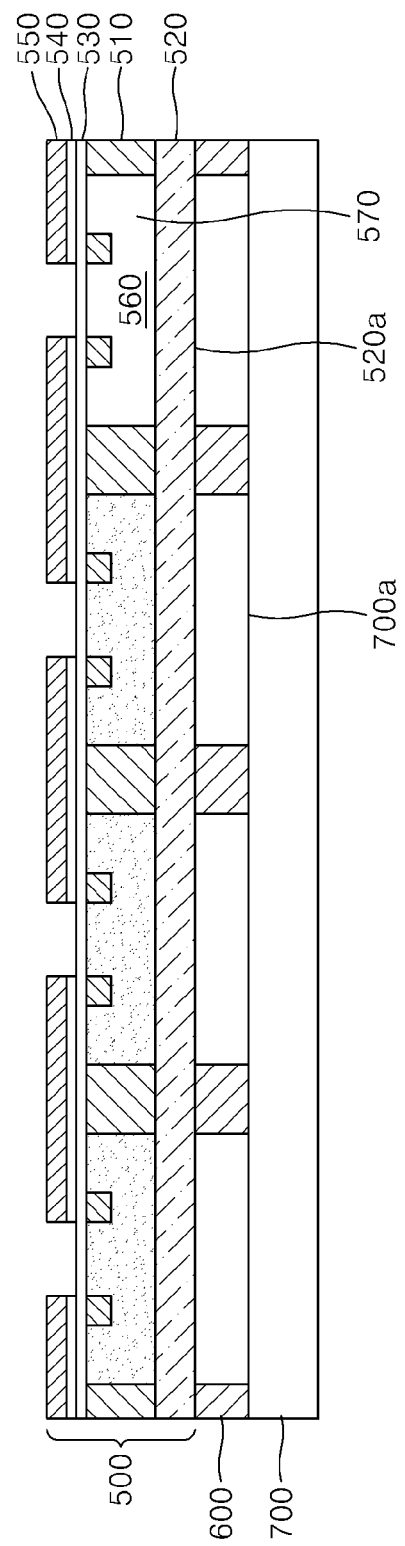

Referring to FIG. 14, the upper surface 700a of the optical device wafer 700 is attached to lower surfaces of the silicone spacers 600. More specifically, if the lower surfaces of the silicone spacers 600 and the upper surface 700a of the optical device wafer 700 are treated with oxygen plasma and then the silicone spacers 600 and the optical device wafer 700 are bonded to each other under pressure in a vacuum condition, the lower surfaces of the silicone spacers 600 may be attached with an adhesive force (e.g., strong) to the upper surface 700a of the optical device wafer 700. In this case, the silicone spacers 600 may be formed at edges of the varifocal lens structures 501 and the optical devices 701. Also, the silicone spacers 600 may have the air vent 400'a (see FIG. 11). The air vent 400'a may allow a space surrounded by the silicone spacers 600 have the substantially same atmospheric condition as the outside when the silicone spacers 600 are attached to the varifocal lens wafer 500 and the optical device wafer 700.

Referring to FIG. 15, if the varifocal lens wafer 500 and the optical device wafer 700 bonded to each other through the silicone spacers 600 are diced in a pattern (e.g., predetermined), manufacturing of a plurality of optical lens modules, each including one varifocal lens structure 501 and one optical device 701 bonded to each other, is completed. As described above, the upper surfaces of the silicone spacers 600 are attached to the varifocal lens wafer 500 and then the lower surfaces of the silicone spacers 600 are attached to the optical device wafer 700. Alternatively, the lower surfaces of the silicone spacers 600 may be first attached to the optical device wafer 700 and then the upper surfaces of the silicone spacers 600 may be attached to the varifocal lens wafer 500.

As described above, in the exemplary embodiment, the varifocal lens wafer 500 is bonded to the optical device wafer 700 through the silicone spacers 600 formed of a silicone elastomer having a high elongation and thus a distance between the varifocal lens structure 501 and the optical devices 701 may be maintained substantially constant. Also, since the contact surfaces of the varifocal lens wafer 500 and the optical device wafer 700 and the contact surfaces of the silicone spacers 600 are subjected to bonding under pressure in a vacuum condition after the contact surfaces are treated with oxygen plasma, the silicone spacers 600 may be attached with an adhesive force (e.g., strong) to the varifocal lens wafer 500 and the optical device wafer 700. Also, even when the varifocal lens wafer 500 or the optical device wafer 700, or both, is deformed before the bonding process or undergoes wafer warpage during the bonding process, the varifocal lens wafer 500 and the optical device wafer 700 may be bonded under pressure in a vacuum condition. In addition, even when heights of the silicone spacers 600 are changed due to contraction or expansion during the bonding, the silicone spacers 600 may return to its original heights by elastic deformation after the dicing process is performed, and a distance between the varifocal lens structure 501 and the optical devices 701 in an optical lens module may be maintained substantially constant.

As described above, in the varifocal lens structures according to the one or more of the above exemplary embodiments, an adhesive silicone layer formed of a silicone elastomer is formed between an polymer actuator and a silicone membrane formed of a silicone elastomer, and due to the adhesive silicone layer, an adhesive force between the polymer actuator and the silicone membrane may be affected. Also, since a silicone spacer formed of a silicone elastomer is formed between a variable lens structure and an optical device, an adhesive force between the variable lens structure and the optical device may be affected and a distance between the variable lens structure and the optical device may be maintained substantially constant.

Although a few exemplary embodiments have been shown and described, it will be appreciated by those skilled in the art that changes may be made in these exemplary embodiments without departing from the principles and spirit of the inventive concept, the scope of which is defined in the appended claims and their equivalents.

What is claimed is:

1. A varifocal lens structure, comprising:
   a liquid lens unit comprising a membrane that comprises a first silicone-based material;
   an actuator disposed on an upper surface of the membrane; and
   an adhesive layer disposed between the membrane and the actuator and comprises a second silicone-based material.

2. The varifocal lens structure of claim 1, wherein the membrane and the adhesive layer comprise same or different materials.

3. The varifocal lens structure of claim 1, wherein the membrane and the adhesive layer each comprise at least one of polydimethylsiloxane (PDMS), polymethylphenylsiloxane (PMPS), and polyvinylsiloxane (PVS).

4. The varifocal lens structure of claim 1, wherein the liquid lens unit comprises:
a frame having a fluid chamber filled with an optical fluid;
the membrane disposed on a first surface of the frame to cover the fluid chamber; and
a transparent substrate that is disposed on a second surface of the frame to form a bottom of the fluid chamber.

5. The varifocal lens structure of claim 4, wherein the membrane comprises a driving portion on which the actuator is disposed, and a variable lens portion that is surrounded by the driving portion and changes a focal distance.

6. The varifocal lens structure of claim 5, wherein each of the actuator and the adhesive layer has a through-hole corresponding to the variable lens portion.

7. The varifocal lens structure of claim 1, wherein the membrane comprises a silicone elastomer.

8. The varifocal lens structure of claim 1, wherein the adhesive layer comprises a silicone elastomer.

9. The varifocal lens structure of claim 1, wherein the actuator comprises a polymer actuator.

10. The varifocal lens structure of claim 1, wherein the membrane layer is bonded to the adhesive layer by treating a surface of the membrane and a surface of the adhesive layer with oxygen plasma.

11. A method of manufacturing a varifocal lens structure, the method comprising:
preparing a liquid lens unit comprising a membrane that comprises a first silicone-based material;
forming an adhesive layer that comprises a second silicone-based material on a surface of an actuator; and
bonding the membrane to the adhesive layer.

12. The method of claim 11, wherein before the bonding of the membrane to the adhesive layer, a surface of the membrane and a surface of the adhesive layer are each treated with oxygen plasma.

13. The method of claim 12, wherein the membrane is bonded to the adhesive layer under pressure in a vacuum condition.

14. The method of claim 11, wherein the membrane comprises a driving portion on which the actuator is disposed, and a variable lens portion that is surrounded by the driving portion and changes a focal distance.

15. The method of claim 14, wherein the forming of the adhesive layer comprises:
applying the second silicone-based material in a liquid form on an actuator material layer;
curing the liquid second silicone-based material to form an adhesive material layer; and
forming a through-hole corresponding to the variable lens portion in each of the actuator material layer and the adhesive material layer, thereby forming the actuator and the adhesive layer.

16. The method of claim 15, wherein before the liquid second silicone-based material is applied, a surface of the actuator material layer is treated with oxygen plasma.

17. The method of claim 11, wherein the membrane and the adhesive layer comprise same or different materials.

18. The method of claim 11, wherein the membrane comprises a silicone elastomer.

19. The method of claim 11, wherein the adhesive layer comprises a silicone elastomer.

20. The method of claim 11, wherein the actuator comprises a polymer actuator.

21. An optical lens module comprising:
a varifocal lens structure configured to change a focal distance by using an optical fluid;
an optical device spaced apart from the varifocal lens structure; and
a spacer disposed between the varifocal lens structure and the optical device, and comprises a silicone-based material.

22. The optical lens module of claim 21, wherein each of a surface of the varifocal lens structure that is bonded to the spacer and a surface of the optical device that is bonded to the spacer comprises at least one of silicon and silicon oxide.

23. The optical lens module of claim 21, wherein the spacer comprises PDMS, PMPS, or PVS.

24. The optical lens module of claim 21, wherein the spacer is disposed at edges of the varifocal lens structure and the optical device.

25. The optical lens module of claim 21, wherein the spacer comprises at least one air vent.

26. The optical lens module of claim 21, wherein the varifocal lens structure comprises:
a frame having a fluid chamber filled with the optical fluid;
a membrane disposed on a first surface of the frame to cover the fluid chamber;
a substrate disposed on a second surface of the frame to form a bottom of the fluid chamber; and
an actuator disposed on the membrane.

27. The optical lens module of claim 26, wherein the spacer is attached to the substrate and the substrate comprises glass.

28. The optical lens module of claim 26, wherein the membrane comprises a silicone-based material, and an adhesive layer that comprises the silicone-based material is disposed between the membrane and the actuator.

29. The optical lens module of claim 28, wherein the membrane comprises a silicone elastomer.

30. The optical lens module of claim 28, wherein the adhesive layer comprises a silicone elastomer.

31. The optical lens module of claim 28, wherein the membrane layer is bonded to the adhesive layer by treating a surface of the membrane and a surface of the adhesive layer with oxygen plasma.

32. The optical lens module of claim 26, wherein the actuator comprises a polymer actuator.

33. The optical lens module of claim 21, wherein the optical device comprises a fixed focal lens structure.

34. A method of manufacturing an optical lens module, the method comprising:
preparing a varifocal lens wafer comprising a plurality of integrated varifocal lens structures and an optical device wafer comprising a plurality of integrated optical devices;
attaching a first surface of a spacer that comprises a silicone-based material to one of the varifocal lens wafer and the optical device wafer, and attaching a second surface of the spacer to another of the varifocal lens wafer and the optical device wafer; and
dicing the varifocal lens wafer and the optical device wafer.

35. The method of claim 34, wherein the spacer is formed at edges of the varifocal lens structures and the plurality of integrated optical devices.

36. The method of claim 34, wherein the spacer comprises at least one air vent.

37. The method of claim 34, wherein each of a surface of the varifocal lens structure bonded to the spacer and a surface of the optical device bonded to the spacer comprises at least one of silicon and silicon oxide.

38. The method of claim 37, wherein the surface of the varifocal lens wafer and the surface of the optical device wafer are treated with oxygen plasma before the spacer is attached.

39. The method of claim 38, wherein the spacer is bonded to the surface of the varifocal lens wafer and the surface of the optical device wafer under pressure in a vacuum condition.

* * * * *